(12) United States Patent  
Williamson et al.

(10) Patent No.: US 7,526,787 B1
(45) Date of Patent: Apr. 28, 2009

(54) METHOD TO REMOTELY PROVIDE TELEVISION BROADCAST RECORDING SERVICES TO BROADCAST TELEVISION SERVICE SUBSCRIBERS

(75) Inventors: Robert Vernon Williamson, Austin, TX (US); Michael Reed, Pflugerville, TX (US); Linda Jones Scott, Georgetown, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 12/163,174

(22) Filed: Jun. 27, 2008

(51) Int. Cl.
*G06F 3/00* (2006.01)
*H04N 7/173* (2006.01)
*H04N 5/91* (2006.01)

(52) U.S. Cl. .................. 725/58; 725/115; 725/131; 386/46; 386/83

(58) Field of Classification Search .............. 725/58, 725/115, 131; 386/46, 83
See application file for complete search history.

(56) References Cited

U.S. PATENT DOCUMENTS

| | | | |
|---|---|---|---|
| 5,805,763 A | 9/1998 | Lawler et al. | |
| 6,442,332 B1 | 8/2002 | Knudson et al. | |
| 6,549,718 B1 | 4/2003 | Grooters et al. | |
| 6,857,129 B2 * | 2/2005 | Rogson et al. | 725/58 |
| 7,073,189 B2 | 7/2006 | McElhatten et al. | |
| 7,149,415 B2 * | 12/2006 | Thiagarajan et al. | 386/113 |
| 2004/0151474 A1 * | 8/2004 | Suh | 386/83 |
| 2005/0160308 A1 * | 7/2005 | Elcock et al. | 714/5 |
| 2006/0248553 A1 * | 11/2006 | Mikkelson et al. | 725/23 |
| 2007/0050818 A1 | 3/2007 | Berger et al. | |
| 2008/0086743 A1 * | 4/2008 | Cheng et al. | 725/38 |
| 2008/0092191 A1 * | 4/2008 | DeBie | 725/116 |
| 2008/0115171 A1 * | 5/2008 | Barsness et al. | 725/58 |
| 2008/0141309 A1 * | 6/2008 | Barsness | 725/58 |

* cited by examiner

*Primary Examiner*—John Miller
*Assistant Examiner*—Chris Parry
(74) *Attorney, Agent, or Firm*—Locke Lord Bissell & Liddell, LLP

(57) ABSTRACT

A system and method for remotely recording television programs using a remote redundant recording system in case of local DVR system failure. The system and method enables a subscriber station to transmit a plurality of recorded timers to a television provider's head end where the timers are associated with television programs the subscriber desires to have remotely recording in case of a local DVR failure. This system and method also enables the data processor at the television provider's head end to monitor the digital recording device while the programs selected are being broadcast, and in the event of a power outage, record the program selected on the data storage space.

1 Claim, 3 Drawing Sheets

METHOD TO REMOTELY PROVIDE TELEVISION BROADCAST RECORDING SERVICES TO BROADCAST TELEVISION SERVICE SUBSCRIBERS

FIELD

The disclosure relates to a service for video recording, and more specifically to a method for remote recording of video.

BACKGROUND

Digital Video Recorders (DVRs) are becoming very common in households. The primary benefit of these devices is that they provide television service subscribers with the ability to record television programs as they are broadcast and watch them at some later time. However, unless there is redundancy, if the DVR device fails to function just prior to or during broadcasting, the selected program will not be recorded. Currently there exist solutions that provide redundancy for DVR devices in cases of signal loss. For example, if signal loss is detected the DVR device will switch over to another signal type during recording, e.g. cable to over-the-air. However, no redundancy solution exists for cases where the DVR device cannot function at all, such as when a local power outage occurs. Accordingly, what is needed is a system for providing redundancy in a DVR system in case of power failure.

SUMMARY

The present method solves the foregoing problems by providing a television broadcast recording service to television service subscribers. The method enables a user's subscriber station to transmit a plurality of recorded timers to a television provider's head end, which are associated with a subset of television programs that the subscriber desires to have remotely recorded in case of a power loss, when the local recording device (DVR) is not functioning. Once power is restored to the DVR, the subscriber can download and watch their recorded programs. One advantage of this method is that a subscriber can reduce the chance of missing a television program he intended to record if a power loss occurs while that program is broadcasting.

In accordance with at least one disclosed example, a method to remotely provide television broadcast recording services to broadcast television service subscribers comprises: receiving at a television provider's head end, a plurality of user recording timers transmitted from a user's subscriber station, wherein the recording timers are set by the user and identify the start time, recording length and channel information for a television program to be recorded, and wherein the number of recording timers is restricted to a predetermined limit based on storage constraints at the provider's head end; setting at the head end a plurality of provider recording timers based on the plurality of user recording timers; sending a first ping from the head end to the subscriber station at a predetermined amount of time before the start time of a television program associated with a provider recording timer; determining the state of the subscriber station from the head end by monitoring the subscriber station for a response to the ping; where the head end does not receive a response from the subscriber station, the television program associated with the recording timer is recorded at the head end; where the head end does receive a response from the subscriber station to the first ping, sending repeated pings from the head end to the subscriber station at predetermined intervals for the duration of the recording length of the television program associated with the recording timer, monitoring the subscriber station for a response to the repeated pings and where the head end does not receive a response from the subscriber station, recording at the head end the television program associated with the recording timer, wherein the recording begins from a point in time at which the subscriber station stopped responding to the repeated pings; and transmitting the recorded television program from the provider's head end to the subscriber station.

DETAILED DESCRIPTION

The present method provides a service to television DVR users providing redundancy by remotely recording video programs. The system is configured to allow a user to select a subset of a list of television shows for remote recording, and has a remote server that records programs in the subset when the local recording device (DVR) is not functioning, such as during a power loss. Once power is restored to the DVR, the subscriber can download and watch their recorded programs.

Figure 1:
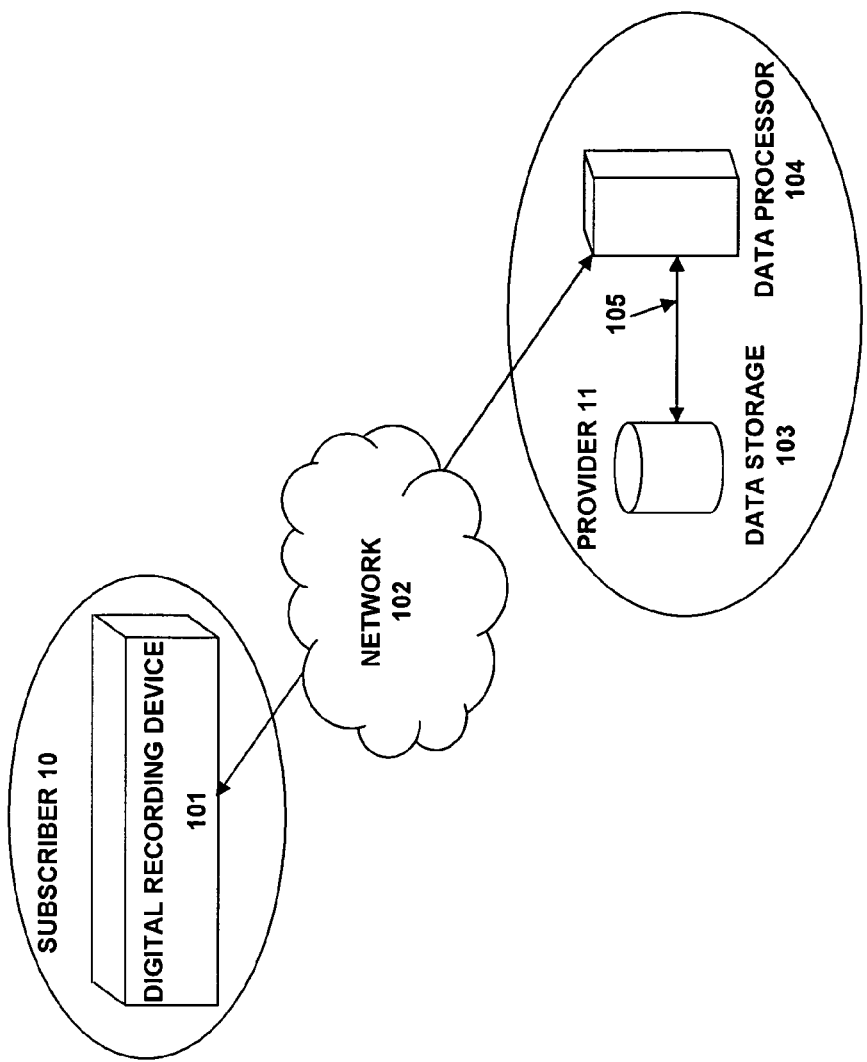
FIG. 1 is a schematic diagram of an exemplary head end, subscriber station, and network configured to remotely record video programming.

FIG. 1 illustrates a television user's subscriber station 10 and a television provider's head end 11. The television user's subscriber station contains a digital recording device 101, typically a Digital Video Recorder (DVR) device which contains a data processor, storage space and port for communication with the television provider's head end. The television provider's head end consists of a data processor 104, typically a server; and a data storage component 103. The data processor must be able to communicate with the data storage component via a digital connection 105. This may be achieved by directly attaching the data storage component to the data processor such as by Firewire or USB, or by connecting both components to the same secure network such as by Ethernet. Furthermore, the television recording device at the user subscriber station must be able to exchange information with the server at the television provider's head end. This communication is typically achieved by connecting both components to the same secure network 102. Each user subscriber station that communicates with the television provider's head end is allocated a certain amount of storage on the data storage space 103 at the television provider's head end. In alternate embodiments the data storage space allocated to a user subscriber station is used to store the plurality of recording timers transmitted from that user subscriber station and/or the programs recorded for that user subscriber station.

Figure 2:
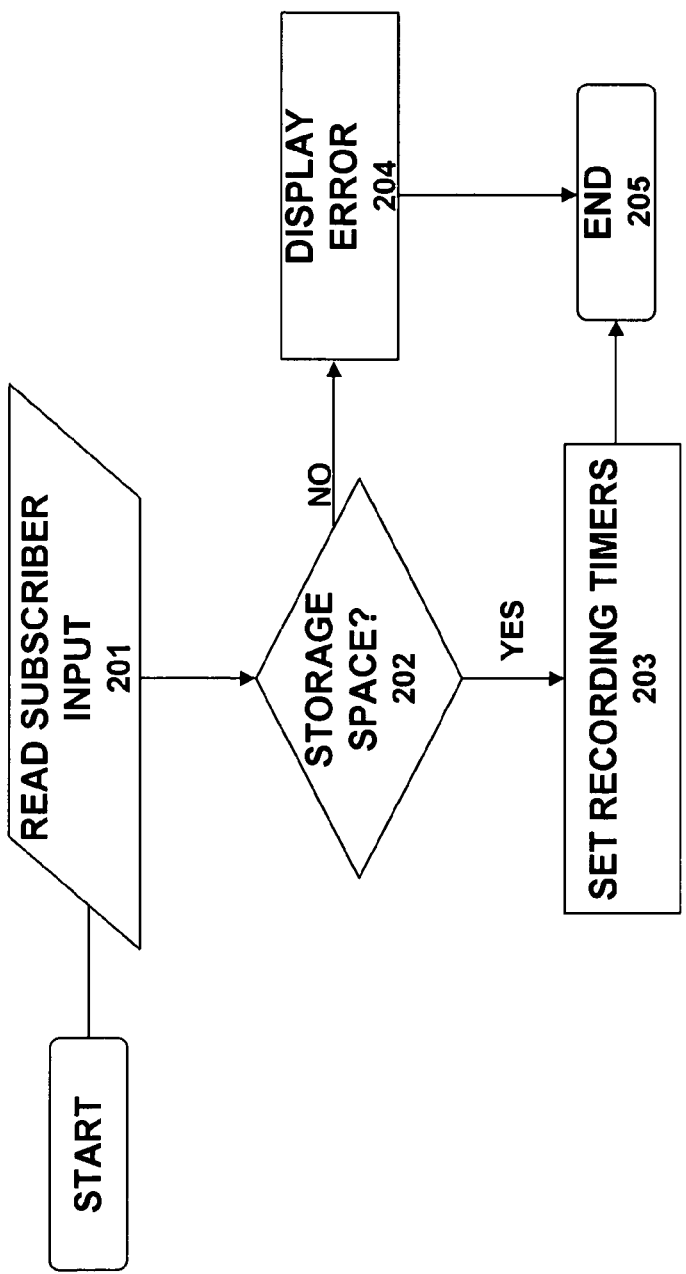
FIG. 2 is a flow diagram of exemplary interactions between the digital recording device subscriber station and the data processor head end to transmit and register the subscriber's recorded timers with the head end data processor.

FIG. 2 is an exemplary flow diagram illustrating steps carried out by the data processor component and data storage component at the television provider's head end. FIG. 2 illustrates one embodiment for monitoring the digital recording device at the television user subscriber station for a power loss or other device failure, and recording the television programs selected for remote recording in the event a power loss occurs.

In step 201, the digital recording device at the television user subscriber station receives a plurality of user recording timers from the subscriber. The timers correspond to the subscriber's television programs that the subscriber desires to have remotely recorded for redundancy. The subscriber can find and select the television programs desired for remote recording through any known techniques, such as searching through a program guide displayed by the DVR device and selecting the programs desired for remote recording by using a remote control which communicates with the DVR device.

In step 202, the digital recording device determines whether the remote recording selections made by the subscriber exceed the amount of storage space limited as a function of (1) the size of the program selected and (2) the amount of storage space allocated for that television user subscriber station at the television provider's head end.

If there is not enough storage space, in step 204, the user subscriber station displays an error to the subscriber and the local DVR will not be monitored for remote recording of the program in case of failure of the device or power loss.

Step 205 is the termination of the sequence of steps until the subscriber selects additional programs for remote recording, in which case the sequence will begin at step 201 again.

In alternate embodiments, a subscriber does not have to select a specific subset of television programs to be remotely recorded. All television programs selected for recording on the digital recording device are monitored and recorded at the television provider's head end in case of failure of the device or power loss as long as there is enough storage space allocated to that user subscriber station to record all of the television programs selected.

If there is enough storage space, in step 203, the recording device transmits a plurality of user recording timers corresponding to the subset of television programs selected, to the data processor at the television provider's head end. Typically a recording timer will identify the start time, recording length, and channel information. The data processor at the television provider's head end then uses this data to create its own recording timers associated with the subset of television programs selected by the subscriber. In alternate embodiments the head end system may use the user subscriber stations' timers stored on the digital recording device. At Step 205 the process terminates until the subscriber selects additional programs for remote recording, in which case the sequence will begin at step 201 again.

Figure 3:
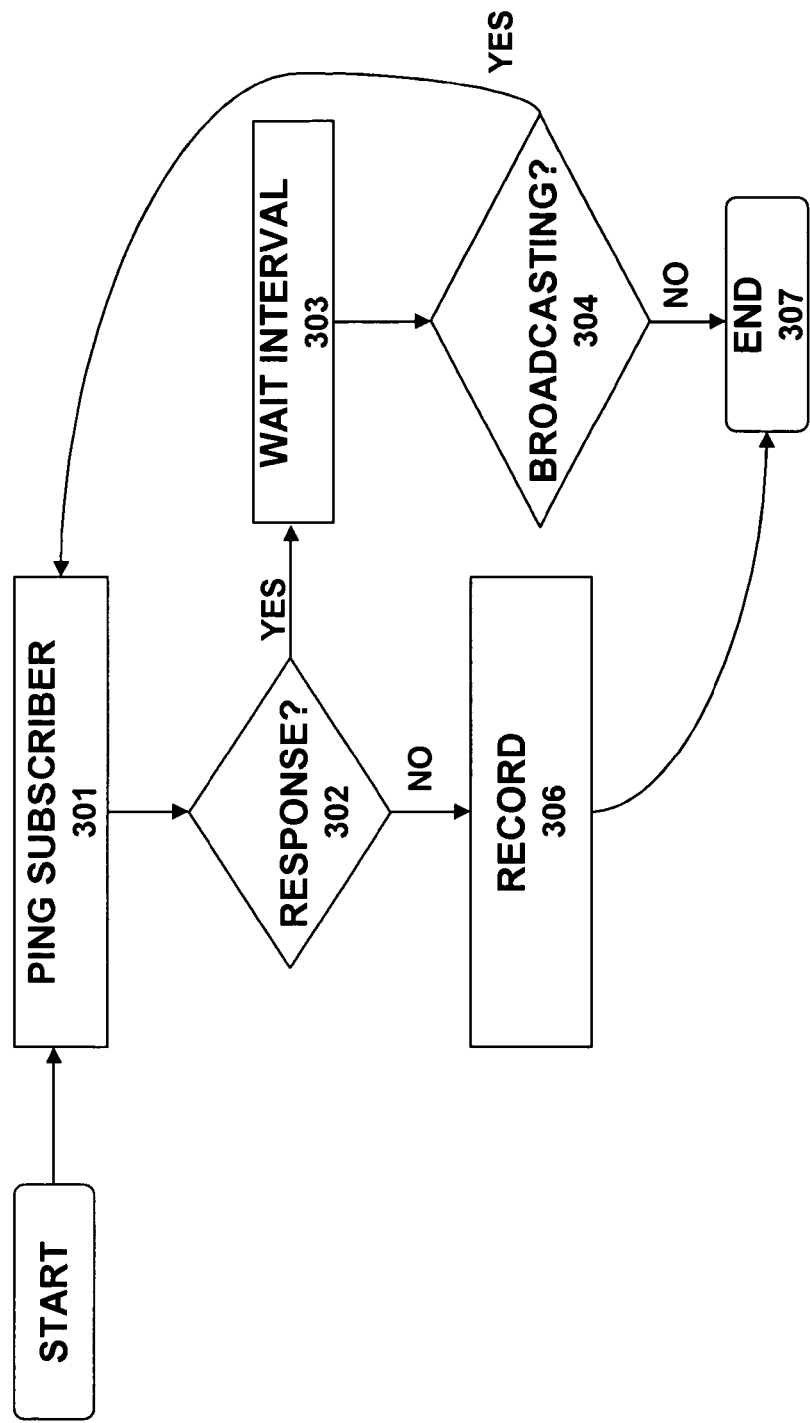
FIG. 3 is a flow diagram of an exemplary interaction between the head end data processor and data storage, and subscriber station to both monitor the subscriber station digital recording device for a power loss, and record the television programs selected for remote recording in the event such a power loss occurs.

FIG. 3 is an exemplary flow diagram of the process carried out by the data processor component and data storage component at the television provider's head end. This process monitors the digital recording device at the television user subscriber station for a power loss, and records the television programs selected for remote recording in the event such a power loss occurs.

In step 301, before the start of a selected television program, the data processor at the television provider's head end begins pinging the subscriber's digital recording device at the television user subscriber station via a network such as a cable television network. The system may be programmed to start the pinging at a predetermined period of time before the show (e.g. five minutes) or of at a random time before the start. In step 302, the data processor checks for a response from the digital recording device in order to determine whether it is still functional.

If the digital recording device responds to the ping, in step 303, the data processor may wait for a period before proceeding to the next step. The waiting period may be based on a predetermined interval, a fixed time, or based on network traffic. In step 304, the data processor determines whether the selected television program is still broadcasting. If the television program is still broadcasting, the data processor returns to step 301 to ping the digital recording device, and then checks for a response from the digital recording device in order to determine whether it is still functional. For example, if it sends out a ping and receives no response or receives an error code it may conclude it is not functioning.

If the digital recording device does not response to the ping, in step 306 the data processor at the television provider's head end assumes there has been a power or other failure and begins to record the television program by remotely storing it on the data storage space at the television provider's head end. In alternate embodiments, $2^{nd}$ and $3^{rd}$ pings may have to go unresponded to before it is concluded the digital recording device is not functioning. This process is repeated for the duration of the program so long as a response to the ping is received.

Once the television program is no longer broadcasting, the recording is terminated at step 307. In other embodiments: (1) the pings continue and the remote recording continues until the end of the timer/programs; (2) the remote recording continues only until a response to the ping is received, indicating that power is restored to the local DVR; or (3) the pings continue until the subscriber cancels the recording.

When the subscriber wishes to view a program that was fully or partially recorded remotely, he may select an option to download the recording to the digital recording device. Alternatively, the downloading may occur automatically upon detection of power restoration or seamlessly upon the user's selection of a recorded program to watch so that the use is unaware the program was even recorded remotely. Where the remote recording is a partial recording resulting from a power loss occurring after the television program began broadcasting, the remotely recorded content is seamlessly concatenated to the end of the locally recorded content, before playback.

It will be appreciated by persons skilled in the art that the present disclosure is not limited to what has been particularly shown and described hereinabove. Rather, the scope of the present disclosure is defined by the claims which follow. It should further be understood that the above description is only representative of illustrative examples of embodiments. For the reader's convenience, the above description has focused on a representative sample of possible embodiments, a sample that teaches the principles of the present disclosure. Other embodiments may result from a different combination of portions of different embodiments.

The description has not attempted to exhaustively enumerate all possible variations. The alternate embodiments may not have been presented for a specific portion of the disclosure, and may result from a different combination of described portions, or that other undescribed alternate embodiments may be available for a portion, is not to be considered a disclaimer of those alternate embodiments. It will be appreciated that many of those undescribed embodiments are within the literal scope of the following claims, and others are equivalent.

What is claimed is:

1. A method for providing redundancy in a video recording system comprising:

receiving at a television provider's head end, a plurality of user recording timers transmitted from a user's subscriber station, wherein the recording timers are set by the user and identify the start time, recording length and channel information for a television program to be recorded, and wherein the number of recording timers is restricted to a predetermined limit based on storage constraints at the provider's head end;

setting at the head end a plurality of provider recording timers based on the plurality of user recording timers;

sending a first ping from the head end to the subscriber station at a predetermined amount of time before the start time of a television program associated with a provider recording timer;

determining the state of the subscriber station from the head end by monitoring the subscriber station for a response to the ping;

where the head end does not receive a response from the subscriber station, the television program associated with the recording timer is recorded at the head end;

where the head end does receive a response from the subscriber station to the first ping, sending repeated pings from the head end to the subscriber station at predetermined intervals for the duration of the recording length of the television program associated with the recording timer, monitoring the subscriber station for a response to the repeated pings and where the head end does not receive a response from the subscriber station, recording at the head end the television program associated with the recording timer, wherein the recording begins from a point in time at which the subscriber station stopped responding to the repeated pings; and transmitting the recorded television program from the provider's head end to the subscriber station.

\* \* \* \* \*